United States Patent [19]

Rothenberg et al.

[11] Patent Number: 4,902,764

[45] Date of Patent: Feb. 20, 1990

[54] POLYMERIC SULFIDE MINERAL DEPRESSANTS

[75] Inventors: Alan S. Rothenberg, Norwalk; David W. Lipp, Stamford; Samuel S. Wang, Cheshire; Donald P. Spitzer, Riverside, all of Conn.

[73] Assignee: American Cyanamid Company, Stamford, Conn.

[21] Appl. No.: 157,559

[22] Filed: Feb. 19, 1988

Related U.S. Application Data

[62] Division of Ser. No. 770,125, Aug. 28, 1985, Pat. No. 4,744,893.

[51] Int. Cl.$^4$ .............................................. C08F 20/06

[52] U.S. Cl. .................................... 526/240; 526/286; 526/320; 526/307.5; 526/307.6; 526/307.7; 526/288; 526/307.3; 209/167

[58] Field of Search .................. 526/320, 307.4, 307.5, 526/307.6, 307.7, 318.42, 303.1, 286, 240; 209/166, 167

[56] References Cited

U.S. PATENT DOCUMENTS

| | | | |
|---|---|---|---|
| 2,870,129 | 1/1959 | Merriam | 526/307.5 |
| 3,642,739 | 2/1972 | Gogh | 526/320 |
| 3,970,633 | 7/1976 | Miller | 526/320 |
| 4,085,260 | 4/1978 | Labana | 525/305 |
| 4,102,843 | 7/1978 | Sperry | 524/219 |
| 4,128,635 | 12/1978 | Hase | 424/81 |
| 4,267,295 | 5/1981 | Gallop | 526/307.5 |
| 4,268,400 | 5/1981 | Lucas | 526/240 |
| 4,288,582 | 9/1981 | Lucas | 526/240 |
| 4,309,329 | 1/1982 | Lucas | 526/240 |
| 4,379,864 | 4/1983 | Gallop | 526/307.5 |
| 4,414,375 | 11/1983 | Neefe | 526/260 |
| 4,425,326 | 1/1984 | Guillon | 526/318 |
| 4,431,769 | 2/1984 | Yoshida | 524/555 |
| 4,443,576 | 4/1984 | Bhattacharyya | 526/303.1 |
| 4,529,782 | 7/1985 | Fan et al. | 526/240 |
| 4,532,294 | 7/1985 | Bouboulis | 526/216 |
| 4,720,339 | 1/1988 | Nagaraj | 209/167 |
| 4,730,081 | 3/1988 | Holtmyer | 260/501.15 |
| 4,744,893 | 5/1988 | Rothenberg | 209/167 |
| 4,757,862 | 7/1988 | Naiman | 166/295 |
| 4,767,550 | 8/1988 | Hanlon | 526/320 |

FOREIGN PATENT DOCUMENTS

| | | | |
|---|---|---|---|
| 161882 | 11/1985 | European Pat. Off. | 526/303.1 |
| 2111159 | 3/1971 | Fed. Rep. of Germany | 526/320 |

*Primary Examiner*—David L. Lacey

*Assistant Examiner*—Thomas M. Lithgow

*Attorney, Agent, or Firm*—Frank M. Van Riet

[57] ABSTRACT

A novel polymer composition comprising recurring units of the formula:

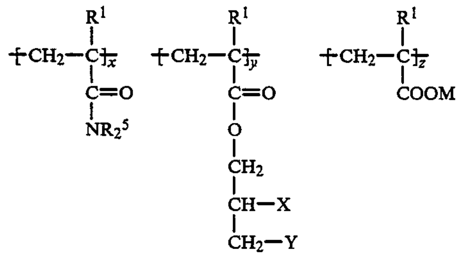

wherein each $R^1$ is, individually, hydrogen or $C_1$-$C_4$ alkyl; each $R^5$, individually, is hydrogen or a $C_1$-$C_4$ lower alkyl group; X is OH or SH; Y is $OR^2$, $SR^2$, $NR_2^2$, or $NR^2$-$NR_2^2$; $R^2$ is hydrogen, a $C_1$-$C_4$ lower alkyl or a $C_1$-$C_4$ substituted lower alkyl, no more than one of Y and X being hydroxyl, and M is hydrogen, an alkali metal cation or an ammonium ion; x represents a residual mole percent fraction; y is a mole percent fraction ranging from about 0.5% to about 25%; z is a mole percent fraction ranging from about 0% to about 25%; and the molecular weight of the polymer is between about 1,000 and 500,000.

3 Claims, No Drawings

POLYMERIC SULFIDE MINERAL DEPRESSANTS

This is a division of application, Ser. No. 06/770,125, filed Aug. 28, 1985 now U.S. Pat. No. 4,744,893.

BACKGROUND OF THE INVENTION

The present invention relates to froth flotation processes for recovery of mineral values from base metal sulfide ores. More particularly, it relates to new and improved sulfide mineral depressants for use in separating or beneficiating sulfide minerals by froth flotation procedures, and to a new and improved process for beneficiating sulfide minerals by froth flotation incorporating these and other depressants.

Certain theory and practice state that the success of the sulfide flotation process depends to a great degree on reagents called collectors that impart selective hydrophobicity to the mineral value which has to be separated from other minerals.

Certain other important reagents, such as the modifiers, are also largely responsible for the success of flotation separation of the sulfide and other minerals. Modifiers include but are not necessarily limited to all reagents whose principal function is neither collecting nor frothing, but usually one of modifying the surface of the mineral so that a collector either adsorbs to it or does not. Modifying agents may thus be considered as depressants, activators, pH regulators, dispersants, deactivators, etc. Often, a modifier may perform several functions simultaneously. Current theory and practice of sulfide flotation again state that the effectiveness of all classes of flotation agents depends to a large extent on the degree of alkalinity or acidity of the ore pulp. As a result, modifiers that regulate the pH are of great importance. The most commonly used pH regulators are lime, soda ash and, to a lesser extent, caustic soda. In sulfide flotation, however, lime is by far the most extensively used. In copper sulfide flotation, which dominates the sulfide flotation industry, for example, lime is used to maintain pH values over 10.5, more usually above 11.0 and often as high as 12 or 12.5. In prior art sulfide flotation processes preadjustment of the pH of the pulp slurry to 11.0 and above is necessary to depress the gangue sulfide minerals of iron, such as pyrite and pyrrhotite. The costs associated with adding lime are becoming quite high and plant operators are interested in flotation processes which require little or no lime addition, e.g., flotation processes which are effectively conducted at slightly alkaline, neutral or even at acid pH values. Neutral and acid circuit flotation processes are particularly desired because pulp slurries may be easily acidified by the addition of sulfuric acid, and sulfuric acid is obtained in many plants as a byproduct of the smelters. Therefore, flotation processes which require preadjustment of pH to neutral or acid pH values using less expensive sulfuric acid are preferable to current flotation processes, which presently require pH preadjustment to highly alkaline values of at least about 11.0 using lime which is more costly.

As has been mentioned above, lime consumption in individual plants may vary anywhere from about one pound of lime per metric ton of ore processed, up to as high as 20 pounds of lime per metric ton or ore. In certain geographical locations, such as South America, lime is a scarce commodity, and the current costs of transporting and/or importing lime has risen considerably in recent years. Still another problem with prior art high alkaline processes is that the addition of large quantities of lime to achieve sufficiently high pH causes scale formation on plant and flotation equipment, thereby necessitating frequent and costly plant shutdowns for cleaning.

It is apparent, therefore, that there is a strong desire to reduce or eliminate the need for adding lime to sulfide flotation processes to thereby provide substantial savings in reagents costs. In addition, reducing or eliminating lime in sulfide ore processes will provide other advantages by facilitating the operation and practice of unit operations other than flotation, such as fluids handling or solids handling, as well as the improved recovery of secondary minerals.

In general, xanthates and dithiophosphates are employed as sulfide collectors in the froth flotation of base metal sulfide ores. A major problem with these sulfide collectors is that at pH's below 11.0, poor rejection of pyrite or pyrrhotite is obtained. More particularly, in accordance with present sulfide flotation theory, the increased flotation of pyrite at a pH of less than 11 is attributed to the ease of oxidation of thio collectors to form corresponding dithiolates, which are believed to be responsible for pyrite flotation.

In addition to attempts at making the sulfide collectors more selective for value sulfide minerals, other approaches to the problem of improving the flotation separation of value sulfides have included the use of modifiers, more particularly depressants, to depress the non-value sulfide minerals and gangue minerals so that they do not float in the presence of collectors, thereby reducing the levels of non-value sulfide contaminants reporting to the concentrates. As has been mentioned above, a depressant is a modifier reagent which selectively prevents or inhibits adsorption of the collectors onto certain of the mineral particles surfaces present in the flotation slurry or pulp. Prior art sulfide depressants have been generally selected from highly toxic inorganic compounds such as sodium cyanide, (NaCN), sodium hydro sulfide, (NaSH), and Nokes reagent ($P_2S_5$ and NaOH). These conventional sulfide depressants present a number of serious problems and have serious shortcomings attendant with their use. The conventional depressants are extremely toxic and are associated with a terrible stench. They cannot be used safely over a wide range of pH values, but instead must be used at high pH values, so that lime consumption problems are not solved by their use. Moreover, the conventional inorganic depressants are either nonselective or when used in sufficient quantities to provide good separation, provide economically unsatisfactory recoveries, i.e., the yield of value minerals is too low.

The problem facing flotation beneficiation methods today is to provide value mineral concentrates which contain substantially reduced levels of gangue sulfide minerals. The flotation concentrates are generally delivered to the smelting operations without any further substantial processing. Large amounts of sulfur dioxide are emitted from the smelters during the smelting of sulfide concentrates; a significant amount of $SO_2$ is from the gangue sulfide minerals such as iron sulfides, which invariably report to the smelters as contaminants in the flotation concentrates. $SO_2$ pollution of the atmosphere has always been a serious problem because it is a major cause for acid rain, which has a devastating effect on the ecology. Despite significant advances in smelting technology, $SO_2$ pollution remains extremely serious.

In addition to the above-mentioned problems in sulfides processing, certain unique problems exist in the case of complex sulfides processing in terms of separation of one value mineral from others. Complex sulfide ores are an important source of many base metals and precious metals. It is quite common to find 3–5 metals in each deposit, in addition to Au,Ag and impurity elements such as Sb, As, Bi and Hg. The treatment method depends on the relative proportions of the different metals, but the more widely used routes are: (a) bulk flotation of sulfides followed by separation of value sulfides, and (b) differential flotation of sulfides. It is necessary to characterize each complex sulfide deposit quantitatively and systematically and then to select the economically optimum combination of process steps to suit the characteristics. Depressants are invariably used in all stages of flotation. Lime, sodium or zinc cyanide, zinc sulfate (often in combination with sodium cyanide), $SO_2$, dichromate, dextrin, hypochlorite, and ferro cyanide are some of the most commonly used depressants.

The benefication criteria for treating the complex sulfide ores are maximum value metal and precious metals (if any) recovery and minimum contamination of the value sulfide concentrate by non-value sulfide minerals. In many cases, these criteria cannot be met without seriously sacrificing value metals production or recovery. Therefore, there remains an urgent need for flotation reagents that can selectively depress gangue sulfide minerals reporting to the concentrate and concurrently provide economically acceptable recoveries of value sulfide minerals.

Unexpectedly, in view of the foregoing, it has now been discovered that certain synthetic polymers which contain certain functional groups are very selective depressants for pyrite, pyrrhotite, and other gangue sulfide minerals. The use of the depressants of the present invention provides a substantial reduction in gangue sulfide minerals contamination in the sulfide minerals concentrates reporting to the smelters, thereby reducing the adverse environmental impact of $SO_2$ emissions caused by smelting operations in the industry.

DESCRIPTION OF THE INVENTION

In accordance with the present invention, new and improved sulfide mineral depressants are provided in the form of polymeric compositions, said compositions comprising a polymer comprising:

(i) x units of the formula:

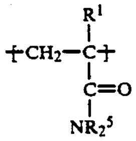

(ii) y units of the formula:

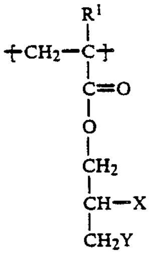

(iii) z units of the formula:

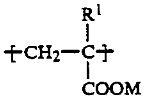

wherein each $R^1$ is, individually, hydrogen or $C_1$–$C_4$ alkyl; each $R^5$, individually, is hydrogen or a $C_1$–$C_4$ lower alkyl group; X is OH or SH; Y is $OR^2$, $SR^2$, $NR^2{}_2$, or $NR^2$-$NR^2{}_2$; $R^2$ is hydrogen, a $C_1$–$C_4$ lower alkyl or a $C_1$–$C_4$ substituted lower alkyl, no more than one of Y and X being hydroxyl, and M is hydrogen, an alkali metal cation or an ammonium ion; x represents a residual mole percent fraction from about 50% to about 99.5%; y is a mole percent fraction ranging from about 0.5% to about 25%; z is a mole percent fraction ranging from about 0% to about 25%; and the molecular weight of the polymer is between about 1,000 and 500,000.

In preferred embodiments, the polymeric compositions comprise polymers within scope of the above definition which comprise as the y units, monomeric units possessing hydroxyl and/or mercaptan functionality. Especially preferred y units for the polymer compositions of the present invention are:

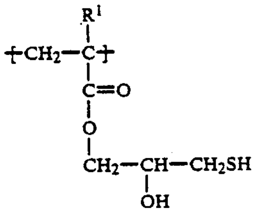

and

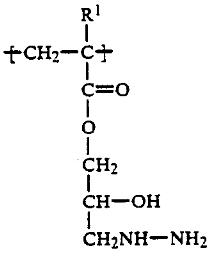

The new and improved compositions of the present invention may be prepared by post-reaction methods whereby a polyacrylamide polymer or a copolymer is prepared, and thereafter the precursor y units are post-reacted generally with an active hydrogen compound possessing the desired moiety to append the desired functional group to the backbone, thereby forming one of the y units defined above.

More particularly, the polymers of this invention comprise as the (i) units, those derived from acrylamide per se, or alkyl acrylamides such as methacrylamide, etc.

The (iii) units of the polymers defined above generally comprise hydrolysis products of the (i) units, said hydrolysis occurring under the reaction conditions to be more particularly described hereinafter. The preferred (iii) units of the polymer shown are derived from acrylic or methacrylic acids or their alkali metal, e.g. sodium or potassium, or ammonium salts.

The (ii) units of the polymer defined above are derived from ethylenically unsaturated monomers which contain selective functional groups. The (ii) units of the polymers are generally prepared by one of two methods. In the first method, acrylamide and a co-monomer containing a pendant group susceptible to attach by an active hydrogen compound which also contains the selective functional group are copolymerized. The copolymer is thereafter reacted with the active hydrogen compound which contains the selective functional group. In accordance with this first method, suitable precursor monomers for use in forming the polymer backbone as the (ii) unit precursors include copolymerizable ethylenically unsaturated monomers containing pendant epoxide groups such as glycidyl acrylate or methacrylate, or halohydrin groups such as 3-chloro- or 3-bromo-2-hydroxypropyl acrylate or methacrylate to name but a few.

By the way of illustration and describing in terms of the preferred embodiments, (ii) units of the polymers may be prepared by post-reacting an acrylamide/glycidyl methacrylate copolymer, with an active hydrogen compound such as, for example, hydrogen sulfide, alkali metal hydrogen sulfides, mercaptoalkanols and the like under conditions of temperature and time ranging from about 0° C. to about 100° C. and 5 minutes to 24 hours, respectively, preferably from about 30° C. to about 70° C. for from about 1 to about 8 hours.

Alternatively, the polymers of the present invention can be prepared by copolymerizing an acrylamide monomer with a co-monomer which already contains the selective functional group utilizing known copolymerization procedures. The co-monomers containing the selective functional group may be prepared by reacting a compound copolymerizable with an acrylamide and susceptible to attack by an active hydrogen compound which contains the selective functional group with said active hydrogen compound under conditions specified above for the post-reacting of the polymer.

In still another aspect, the present invention provides a new and improved method for the beneficiation of value sulfide minerals from sulfide ores with selective rejection of gangue sulfide minerals, said method comprising:

(a) providing an aqueous pulp slurry of finely-divided. liberation-sized ore particles;

(b) conditioning said pulp slurry with an effective amount of a snythetic depressant, a sulfide mineral collector and a frothing agent, said synthetic depressant comprising a polymer comprising:

(i) x units of the formula:

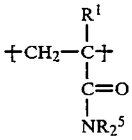

;

(ii) y units of the formula:

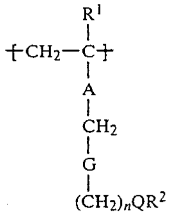

; and (iii) z units of the formula:

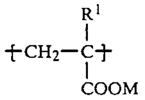

wherein each $R^1$ is, individually, hydrogen or $C_1$–$C_4$ lower alkyl; $R^2$ is hydrogen, $C_1$–$C_4$ lower alkyl or $C_1$–$C_4$ substituted lower alkyl; A is a bridging group selected from

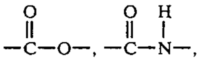

, $C_6H_4$ and $C_2$–$C_{10}$ alkylene; G is a valence bond or a group selected from

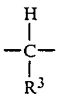

and

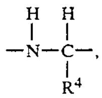

, wherein $R^3$ is H, OH or SH and $R^4$ is H or COOM; n is 0 or 1; Q is selected from —0—,

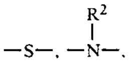

or $—NR^2—NR^2—$; M is hydrogen, an alkali metal cation or an ammonium ion; x represents a residual mole percent fraction; y is a mole percent fraction ranging from about 0.5 to about 25%; z is a mole percent fraction ranging from about 0% to about 25%; and the molecular weight of said polymer is between 1,000 and about 500,000; and, (c) collecting the value sulfide mineral by froth flotation procedures.

The new and improved method for beneficiating value sulfide minerals by froth flotation procedures employing the synthetic depressants in accordance with this invention provides excellent metallurgical recovery with significant improvements in grade. The novel sulfide mineral depressants are effective over a wide range of pH and dosages. The depressants are compatible with available frothers and sulfide mineral collectors and may be readily incorporated into many currently operating system or facility. Moreover, use of the polymeric sulfide mineral depressants can significantly reduce $SO_2$ emissions from smelting operations.

The (ii) units defined immediately hereinabove, which are identical to those taught hereinbefore, may be prepared as described with respect thereto.

Furthermore, when A is a

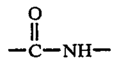

group, these polymers may be prepared by reacting the acrylamide units of the polymer with formaldehyde or other aldehyde generation compound and a primary or secondary amine which contains the desired functional group. The reaction may be conducted under conditions wellknown to those skilled in the art, i.e. contact of the polymer with the aldehyde generating compound and the amine, e.g. 2-mercaptoethylamine hydrochloride, at room temperature for 1–10 hours with agitation, see C. Mannich et al; Arch. Pharm; 250, 647 (1912).

Additionally, when A is an aromatic group or an alkylene group. various ethylenically unsaturated, halogen substituted hydrocarbons such as vinylbenzyl chloride and polyethylenically unsaturated hydrocarbons such as butadiene, isoprene may be used as the comonomers with which the acrylamide is copolymerized to form the copolymers which are then post-reacted with the active hydrogen compound to form the depressants useful herein.

The present invention is also directed to the selective separation of sulfides, for example, gangue sulfides removal from copper ores, copper-molybdenum ores, complex sulfide ores containing lead, copper, zinc, silver, gold, etc., nickel and nickel-colbalt ores, gold ores and gold-silver ores, and to facilitate copper-lead, lead-zinc, copper-zinc separations, etc.

The following examples are set forth for purposes of illustration only and are not to be construed as limitations on the present invention, except as set forth in the appended claims. All parts and percentages are by weight unless otherwise specified. Molecular weights are viscosity average molecular weights.

EXAMPLE 1

Acrylamide (9.0 parts), glycidyl methacrylate (1.0 part) and dioxane are sparged with nitrogen for 30 minutes. Azobisisobutyronitrile (0.1 part) is added and the mixture is heated to 65° C. with stirring. The copolymer precipitates out of the dioxane when it is formed. The precipitated polymer is dried under nitrogen. Then the copolymer (5.0 parts), is dissolved in water 45 g. To this solution is added $NaSH \cdot H_2O$(0.25 part) in water (10.0 parts). The mixture is stirred at 25° C. for 4 hours.

The structure of the resultant terpolymer is:

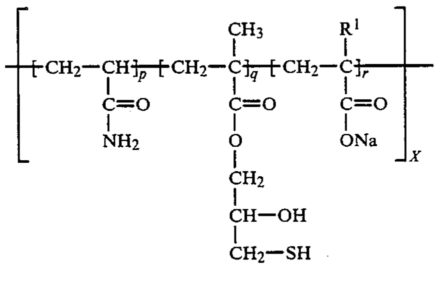

wherein the final mole ratio of p: q: r is 94:5:1, and has a molecular weight of about 50,000. Analysis by infrared shows one percent mole of acrylic acid.

EXAMPLE 2

Acrylamide (9.0 parts) is dissolved in deionized water (85 parts) and the solution is placed in a suitable 3-neck flask equipped with a nitrogen inlet tube and stirrer. The solution is sparged for 30 minutes while being heated to 30 ° C., and glycidyl methacrylate (1.0 part) is then added. To this is added a nitrogen sparged solution of sodium metabisulfite (0.20 part) in water (5.0 parts) and five minutes later a nitrogen sparged solution of ammonium persulfate (0.10 part) in water (5.0 parts). The nitrogen inlet tube is raised above the liquid surface, and the flask insulated. The reaction temperature gradually increases to 40°–50° C. over a two hour period, and the temperature is then maintained in this range, with heating, if necessary, for one additional hours. The reactor is then cooled to 30° C. and a solution of sodium hydrosulfide hydrate ($NaSH \cdot H_2O$, 0.55 part) in water (5.0 part) is added. The reaction mixture is stirred for six hours and the pH is then adjusted to 7.0 with sulfuric acid. The resulting polymer has a molecular weight of 30,000 and contains about 2% carboxylate. Polymer solution strength is about 10%.

EXAMPLES 3–17

Using a procedure similar to that described in Example 2, a series of acrylamide/glycidyl methacrylate copolymers of varying compositions and molecular weights are prepared, and these are reacted with a variety of active hydrogen compounds. Compositions prepared are shown in Table 1.

TABLE 1

| | Mole % | | | |
|---|---|---|---|---|
| Example | Acrylamide | Glycidyl Methacrylate | Molecular Weight | Acitve Hydrogen Compound |
| 3 | 95 | 5 | 100,000 | NaSH |
| 4 | 90 | 10 | 100,000 | NaSH |
| 5 | 96.7 | 3.3 | 30,000 | NaSH |
| 6 | 98 | 2.0 | 30,000 | NaSH |
| 7 | 95 | 5 | 15,000 | NaSH |
| 8 | 95 | 5 | 7,000 | NaSH |
| 9 | 95 | 5 | 30,000 | $CH_3SH$ |
| 10 | 95 | 5 | 30,000 | $CH_3(CH_2)_3SH$ |
| 11 | 95 | 5 | 30,000 | $(CH_3)_2CH$ OH |
| 12 | 95 | 5 | 30,000 | $NH_3$ |
| 13 | 95 | 5 | 30,000 | $H_2N(CH_2)_2SH$ |
| 14 | 80 | 20 | 2,500 | $H_2N(CH_2)_2SH$ |
| 15 | 95 | 5 | 200,000 | $(CH_3)_2NH$ |
| 16 | 95 | 5 | 30,000 | $H_2N—NH_2$ |
| 17 | 99 | 1 | 250,000 | $(CH_3)_2N—NH_2$ |

EXAMPLE 18

Using a procedure similar to that described in Example 2, an acrylamide/glycidyl acrylate polymer is prepared and then reacted with NaSH. The resulting polymer has a molecular weight of 30,000 and contains 5 mole % (theoretical) mercaptan functionality and 1% carboxyl groups.

EXAMPLE 19

Acrylamide (9.0 parts) is dissolved in deionized water (85 parts) and the solution is placed in a suitable 3 neck flask equipped with a nitrogen inlet tube and stirrer. The solution is sparged for 30 minutes while being heated to 30° C., and glycidyl methacrylate (1.0 part) is then added. To this is added a nitrogen sparged solution of sodium metabisulfite (0.20 part) in water (5.0 parts) and five minutes later a nitrgoen sparged solution of ammonium persulfate (0.10 part in water (5.0 parts). The nitrogen inlet tube is raised above the liquid surface, and the flask insulated. The reaction temperature gradually increases to 40°–50° C. over a two hour period, and thê temperature is then maintained in this range with heating, if necessary, for one additional hour. At the end of this interval, the mixture is heated to 60° C. and agitation is continued for 24 hours to affect epoxide hydrolysis. The final product is obtained at about 10% polymer solids. The polymer has a molecular weight of about 30,000 and contains about 0.5% carboxylate and the theoretical 5 mole % glycol functionality.

EXAMPLE 20

A dry polyacrylamide (15.5 parts) having a molecular weight of about 25,000 is dissolved in deionized water (124 parts), and 37% aqueous formaldehyde (1.6 parts) and 2-mercaptoethylamine hydrochloride (2.26 parts) in deionized water (20 parts) is added. The mixture is stirred for 6 hours at room temperature to give a Mannich reaction product having the structure indicated below with a degree of substitution of 10%.

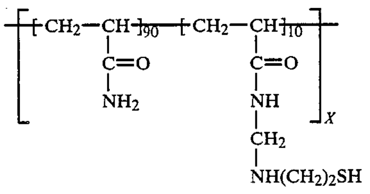

EXAMPLES 21-25

Using a procedure similar to that described in Example 20, a range of polyacrylamides of varying molecular weights is reacted with formaldehyde and a variety of active hydrogrn compounds to provide the Mannich reaction products. Products are listed in Table 2.

TABLE 2

| Example | Polyacrylamide Molecular Weight | Active Hydrogen Compounds | Degree of Substitution |
|---|---|---|---|
| 21 | 5,000 | $H_2N(CH_2)_2SH$ | 5% |
| 22 | 25,000 | 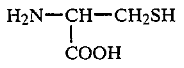 | 10% |
| 23 | 5,000 | 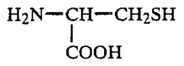 | 5% |
| 24 | 5,000 | $H_2N(CH_2)_2SH$ | 10% |
| 25 | 150,000 | 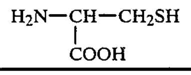 | 20% |

EXAMPLE 26

Thioglycidyl methacrylate is prepared from glycidyl methacrylate according to the procedure described in British Patent Br. 1,059,493 (1963). Prior to polymerization the thioglycidyl methacrylate monomer is purified by distillation under argon with the fraction boiling between 72°-73° C. at 10.8 mm being collected. N-Methylacrylamide (17.9 parts), thioglycidyl methacrylate (2.1 parts), methanol (500 parts), and AIBN (0.2 part) are added to an autoclave and the mixture is sparged with nitrogen and then heated to 60° C. for 4 hours. The resulting copolymer in methanol is cooled to 40° C., and hydrogen sulfide is then introduced to saturate the methanol. The autoclave is kept at 40° C. for 24 hours and then sparged with nitrogen to remove unreacted $H_2S$. After stripping of the methanol solvent, the N-methylacrylamide 2,3-dimercaptopropyl methacrylate copolymer is ready for use as a depressant.

EXAMPLE 27

In this example, pure pyrite and chalcopyrite samples are used. Flotation tests are carried out in a 250 ml glass cell with a coarse fritted bottom. The as-received large crystals of pyrite and chalcopyrite are crushed and screened to obtain −8+35 mesh size fraction. This fraction is stored at all times in a freezer at −18° C. Just before a flotation test, a small sample of pyrite (or chalcopyrite) is ground in an agate mortar with an agate pestle and screened to obtain approximately 1 g. of −100+200 mesh fraction. This is mixed with 9 g. of clean −48+65 or −65+100 mesh quartz and the mixture is suspended in 240 ml distilled water containing $2\times10^{-3}$M $KNO_3$ (to maintain ionic strength) and conditioned as follows: (a) 1 min. for pH adjustment to 8.5 with KOH and $HNO_3$, (b) 2 min. with 5 ml of $5\times10^{-2}$M sodium isopropyl xanthate (this was sufficient to give almost complete flotation of pyrite), (c) 2 min. with 2.5 ml of 0.1% depressant solution (10 ppm) and 2.5 ml of 3000 ppm methylisobutyl carbinol (MIBC) frother solution (30 ppm final concentration). Flotation is then carried out by passing nitrogen until no more solids are floating. The concentrates and tails are filtered separately, dried and weighed.

The test results are given in Table 3. It is evident that the polymer selectively depresses pyrite quite effectively. Chalcopyrite is depressed only slightly. This selectivity against chalcopyrite is a very important desirable feature in a depressant.

TABLE 3

| Example No. | Depressant 10 ppm | Overall Recovery % In Flotation Test $FeS_2$ | $CuFeS_2$ |
|---|---|---|---|
| A | None | 95 | 97 |
| 27 | Polymer of Example 1 | 22 | 93 |

EXAMPLES 28-29

In these examples a Ni-Cu flotation feed is used containing 0.477% Cu, 1.06% Ni and 58.7% Po. (for the sake of convenience, Po, which denotes pyrrhotite, is meant here to include other gangue iron sulfides, if any). The feed is obtained after primary magnetic separation and flotation that provides a high grade Cu and Ni concentrate. The flotation feed (already contacted with xanthate collector and frother in the primary flotation stage) is conditioned in a flotation cell at 1400 rpm with the depressant for 2 minutes at a pH of 9.5-10.5. Flotation is then carried out in stages for a total of 8 minutes. Frother is added, as required.

The test results are set forth in Table 4. In the control tests B and C (no depressants used), the Ni, Cu, and Po recoveries are 63%, 88-89% and 34-38%, respectively. When 110 g/T of polymer of Example 21 are used, the Po recovery decreases from 34 to 38% (for B and C) to only 4.7%, with an associated drop in Cu and Ni recoveries (Example 28). Both the Ni and Cu grades of the concentrate increase. This example illustrates a case wherein most of the Po is depressed as a result of the use of a very high dosage of the polymer.

The use of the polymer of Example 3 decreased Po recovery from 34 and 38% to 13.7% (more than 50% reduction) with only nominal losses in Ni and Cu recoveries (Example 29). In other words, both the polymers (of Example 3 and 21) exhibit excellent depressant activity for the gangue sulfide minerals, viz. Po.

TABLE 4

| Evaluation of Novel Depressants for Po Rejection | | | | | | | | |
|---|---|---|---|---|---|---|---|---|
| EXAMPLE | DEPRESSANT | | WT % | Cu | | Ni | | Po |
| # | of Example | g/T | CONC | REC | GRADE | REC | GRADE | REC |
| B | No depressant | — | 23.7 | 89.1 | 1.8 | 62.5 | 2.6 | 34.1 |
| C | No depressant | — | 25.6 | 88.8 | 1.6 | 63.8 | 2.5 | 37.8 |
| 28 | 21 | 110 | 6.0 | 77.6 | 6.0 | 27.1 | 4.4 | 4.7 |
| 39 | 3 | 98 + 54* | 12.5 | 80.5 | 3.0 | 44.2 | 3.6 | 13.7 |

*98 g/T added prior to flotation and 54 g/T added after 4 minutes of flotation.

EXAMPLES 30-32

The feed and the test procedure used for these tests is the same as that used for Examples 28-29. The effect of molecular weight and degree of substitution on the depressant activity is investigated at a constant dosage of the depressant of about 160 g/T. The results are set forth in Table 5. It is evident that all the three depressants showed very high depressant activity. In these examples, the degree of substitution and molecular weight in the range tested appear to have little or no influence on the overall performance of the depressant.

TABLE 5

| EXAMPLE | DEPRESSANT | | | | WT. % | Cu | | Ni | | Po |
|---|---|---|---|---|---|---|---|---|---|---|
| # | of Example | MW,K* | DS** | g/T | CONC. | REC. | GRD. | REC. | GRD. | REC. |
| 30 | 3 | 100 | 5 | 160 | 12.9 | 80.9 | 2.86 | 44.6 | 3.42 | 14.8 |
| 31 | 4 | 100 | 10 | 160 | 19.8 | 85.4 | 1.90 | 55.2 | 2.69 | 24.8 |
| 32 | 2 | 30 | 5 | 160 | 14.9 | 80.6 | 2.37 | 50.7 | 3.24 | 18.4 |
| D | NONE | — | — | — | 29.1 | 86.2 | 1.22 | 64.2 | 2.18 | 39.2 |

*MW is molecular weight; K is 1000;
**DS = Degree of substitution of functional groups - Mole %

EXAMPLES 33-37

Using the test procedure outlined in Examples 28-29, the depressant activity as a function of dosage of polymers of Examples 2 and 3 is tested. The results given in Table 6 demonstrate that the depressant activity increases as the dosage increases.

TABLE 6

| EXAMPLE | DEPRESSANT | | WT. % | Cu | | Ni | | Po |
|---|---|---|---|---|---|---|---|---|
| # | of Example | g/T | CONC. | REC. | GRD. | REC. | GRD. | REC. |
| E | None | — | 41.1 | 87.9 | 0.83 | 71.7 | 1.88 | 52.5 |
| 33 | 3 | 46.0 | 29.4 | 84.6 | 1.19 | 59.5 | 2.22 | 36.6 |
| 34 | 4 | 87.0 | 22.7 | 81.5 | 1.50 | 50.2 | 2.44 | 28.6 |
| 35 | 3 | 147.0 | 20.6 | 77.0 | 1.54 | 51.4 | 2.72 | 24.3 |
| 30 | 3 | 160.0 | 12.9 | 80.9 | 2.86 | 44.6 | 3.42 | 14.8 |
| 36 | 2 | 50.0 | 26.8 | 78.9 | 1.13 | 58.8 | 2.10 | 34.6 |
| 37 | 2 | 96.0 | 18.2 | 76.9 | 1.65 | 53.1 | 2.81 | 23.8 |
| 32 | 2 | 160.0 | 14.9 | 80.6 | 2.37 | 50.7 | 3.21 | 18.4 |

EXAMPLES 38-40

The effect of degree of substitution of the functional groups on the polymer at a constant dosage of 135 g/T is demonstrated using the test procedure as in Examples 28-29. The results given in Table 7 show that the depressants perform well at all levels of substitution.

TABLE 7

| EXAMPLE | DEPRESSANT | | DS, | | WT. % | Cu | | Ni | | Po |
|---|---|---|---|---|---|---|---|---|---|---|
| # | of Example | MW,K | Mole % | g/T | CONC. | REC. | GRD. | REC. | GRD. | REC. |
| F | None | — | — | — | 41.3 | 86.4 | 1.09 | 74.7 | 1.81 | 59.0 |
| 38 | 2 | 30 | 5 | ~135 | 27.0 | 82.9 | 1.65 | 62.6 | 2.35 | 33.7 |
| 39 | 5 | 30 | 3.3 | ~135 | 29.2 | 85.7 | 1.61 | 65.7 | 2.32 | 38.4 |
| 40 | 6 | 30 | 2.0 | ~135 | 27.9 | 85.7 | 1.60 | 63.7 | 2.27 | 36.2 |

EXAMPLES 41-44

The effect of molecular weight of the depressant at a constant mole % functional groups is tested at a constant dosage of 98 g/T using the procedure set forth in Examples 28-29. The results given in Table 8 show that the polymers maintain good depressant activity at all molecular weight levels.

TABLE 8

| EXAMPLE | DEPRESSANT | | DS, | | WT % | Cu | | Ni | | Po |
|---|---|---|---|---|---|---|---|---|---|---|
| # | of Example | MW,K | Mole % | g/T | CONC. | REC. | GRD. | REC. | GRD. | REC. |
| G | None | — | — | — | 48.3 | 84.7 | 1.08 | 78.0 | 1.93 | 63.6 |
| 41 | 2 | 30 | 5 | 98.0 | 26.3 | 74.1 | 1.79 | 56.7 | 2.54 | 31.2 |
| 42 | 3 | 100 | 5 | 98.0 | 31.3 | 80.2 | 1.35 | 60.6 | 2.06 | 38.9 |

TABLE 8-continued

| EXAMPLE # | DEPRESSANT of Example | MW,K | DS, Mole % | g/T | WT % CONC. | Cu REC. | Cu GRD. | Ni REC. | Ni GRD. | Po REC. |
|---|---|---|---|---|---|---|---|---|---|---|
| 43 | 7 | 15 | 5 | 98.0 | 41.4 | 82.1 | 1.34 | 72.7 | 2.17 | 53.3 |
| 44 | 8 | 7 | 5 | 98.0 | 35.8 | 80.7 | 1.45 | 66.7 | 2.21 | 46.8 |

EXAMPLES 45–46

The effect of aging and aeration of the pulp on the depressant activity of the polymers of this invention is tested using essentially the procedure set forth in Examples 28–29, except that the pulp is agitated (open to atmosphere) in a flotation cell for 30 minutes (including 2 minutes aeration in between) prior to addition of the polymer. The results given in Table 9 demonstrate that the depressant activity is maintained or even increased for the aged and aerated pulp, and that the polymer is able to depress even aged and oxidized Po quite effectively.

TABLE 9

| EXAMPLE # | DEPRESSANT of Example | g/T | WT. % CONC. | Cu REC. | Cu GRD. | Ni REC. | Ni GRD. | Po REC. |
|---|---|---|---|---|---|---|---|---|
| H | None | — | 35.8 | 86.5 | 1.15 | 68.2 | 2.05 | 44.8 |
| 45 | 3 | 52.2 | 21.7 | 83.8 | 1.86 | 57.5 | 2.78 | 26.3 |
| 46 | 3 | 100.5 | 17.0 | 82.9 | 2.36 | 51.8 | 3.25 | 18.3 |

EXAMPLE 47

Using the procedure set forth in Examples 28–29, the depressant activity of the polymer of Example 3 is investigated on magnetic pyrrhotite which is very difficult to depress. The xanthate collector dosage in these tests on magnetic Po is 37.5 g/T. The results are shown in Table 10. A comparison of Examples H (no depressant) and 47 shows that the polymer of Example 3 is effective even on magnetic Po.

TABLE 10

| EXAMPLE # | DEPRESSANT of Example | g/T | WT. % CONC. | Cu REC. | Cu GRD. | Ni REC. | Ni GRD. | Po REC. |
|---|---|---|---|---|---|---|---|---|
| I | None | — | 28.6 | 58.2 | 0.76 | 57.2 | 2.17 | 37.9 |
| 47 | 3 | 141 + 47* | 19.1 | 54.8 | 1.08 | 50.3 | 2.88 | 23.7 |

*Stage addition.

EXAMPLE 48

Using the procedure outlined in Examples 28–29, the depressant activity of the polymer of Example 19 is tested and the results obtained demonstrate the high activity of this polymer (Table 11).

TABLE 11

| EXAMPLE # | DEPRESSANT of Example | g/T | WT. % CONC. | Cu REC. | Cu GRD. | Ni REC. | Ni GRD. | Po REC. |
|---|---|---|---|---|---|---|---|---|
| J | None | — | 32.8 | 87.2 | 1.45 | 69.2 | 2.61 | 39.8 |
| 48 | 19 | 115 | 12.3 | 77.9 | 3.51 | 52.9 | 5.36 | 12.1 |

EXAMPLES 49–51

Mannich reaction products of Examples 20–22 are tested for their depressant activity using the same procedure as outlined in Examples 28–29. As the results in Table 12 indicate, these polymers show good depressant activity.

TABLE 12

| EXAMPLE # | DEPRESSANT of Example | g/T | WT. % CONC. | Cu REC. | Cu GRD. | Ni REC. | Ni GRD. | Po REC. |
|---|---|---|---|---|---|---|---|---|
| K | None | — | 41.3 | 83.9 | 0.74 | 71.8 | 1.67 | 50.5 |
| 49 | 20 | 69.1 | 23.4 | 86.0 | 1.61 | 58.9 | 2.49 | 31.5 |
| 50 | 21 | 93.5 | 10.3 | 77.3 | 2.98 | 38.4 | 3.70 | 11.2 |
| 51 | 22 | 43.2 | 23.2 | 83.1 | 1.13 | 50.0 | 2.05 | 30.2 |

EXAMPLES 52–56

Using the procedure outlined in Example 27, the depressant activity of a number of Mannich reaction products is tested. The results, given in Table 13, clearly demonstrate that all the polymers tested depress pyrite very effectively, but chalcopyrite only slightly (except for the polymer of Example 20).

TABLE 13

| Example # | Depressant of Example | Dosage ppm | % flotation recovery FeS$_2$ | % flotation recovery CuFeS$_2$ |
|---|---|---|---|---|
| L | No depressant | — | 95 | 97 |
| 52 | 20 | 10 | 1 | 16 |
| 53 | 21 | 10 | 6 | 90 |
| 54 | 22 | 10 | 3 | 84 |
| 55 | 24 | 10 | 3 | 91 |
| 56 | 25 | 10 | 4 | 80 |

EXAMPLE 57

A Cu-Zn-Fe-S complex sulfide ore is used in this example. This ore assayed 1.246% Cu, 0.925% Zn, 35.8% S and 55.2% Fe. About 75% of the iron is in the form of pyrrohotite and the remaining amount is in the form of pyrite. Since the ore is so rich in Fe and S, both are recovered as important products. The benefication method consists of bulk sulfide flotation of ground ore in an acid circuit (pH 5-6) using a xanthate collector and $H_2SO_4$ to adjust pH; regrinding of the sulfide concentrate with lime (to depress iron sulfides); conditioning of the reground pulp with sodium silicate, sodium cyanide (to depress iron sulfides and zinc sulfide) and xanthate collector at pH 10.5-11.0; and flotation of copper sulfides. Since the bulk flotation is carried out in acid circuit and the Cu-Fe separation in alkaline circuit, large amounts of lime are required from pH control and Fe depression. Also cyanide, which is an environmental hazard, has to be added to assist Fe depression. The large usage of lime and cyanide makes this separation method unattractive. The depressant of Example 3 is tested on this application to replace cyanide and lime either partially or completely. The results are given in Table 14. As the results indicate, Fe and S recovereis are not as low as with NaCN, but they are acceptable because this is only a rougher flotation operation and generally will be followed by one or more cleaner flotation stages in the field. Copper recovery of 93.3% obtained with the depressant indicates the selective nature of the polymer in this application. Even the zinc recovery is much higher than with NaCN, again indicating high selectivity.

TABLE 14

| Example | | | Lime | WT. % | % Recovery | | | |
|---|---|---|---|---|---|---|---|---|
| # | Depressant | g/T | Kg/T | CONC. | Cu | Fe | S | Zn |
| M | None | 0 | 0 | — | 96.5 | 90.6 | 97.5 | 56.1 |
| N | NaCN | 107 | 5.65 | 21.0 | 74.8 | 18.8 | 20.8 | 30.1 |
| 57 | 3 | 107 | 1.34 | 32.2 | 93.3 | 30.3 | 33.2 | 52.5 |

EXAMPLES 58-59

A lead-zinc ore is used in this example, the objective being to replace the environmentally unacceptable NaCN which is currently used for this ore to depress iron sulfide gangue and zinc sulfides without seriously decreasing lead, silver and copper recoveries. The depressant of Example 3 is evaluated as a full cyanide substitute with additions made to the grinding mill. A 1 Kg sample of the rod mill feed is mixed with 400 ml of tap water and the appropriate amount of the depressant, and ground in a mill for 9 minutes to obtain a pulp which is 65%-200 mesh. The ground pulp is transferred to a flotation cell and made up to volume using tap water. Ethyl xanthate collector is then added at 50 g/T and the pulp is conditioned and aerated at 750 rpm for 2 minutes at the end of which MIBC frother is added. A first stage flotation concentrate is then collected for 2 minutes. An additional 20 g/T of collector and appropriate amount of frother are added and a second stage flotation concentrate is collected for 2 minutes. Both the concentrates are then combined in a 0.5 liter cell, made up to volume and a cleaner flotation is performed. This consists of two stage flotation—each of 1 minute duration and 5 g/T collector in each stage. Frother is added as required. The two concentrates from this cleaner stage are combined and refloated in a recleaner step to collect two 0.5 minute concentrates and one 1 minute concentrate using 10 g/T of xanthate for the second 0.5 minute float, and frother as required. The six products—recleaner concentrates 1, 2 and 3, recleaner tail, cleaner tail and rougher tail—are assayed for Ag, Pb, Zu, Cu, and Fe.

TABLE 15

| Example # | Depressant | g/T | WT. % | Total Recleaner Concentrate % Recovery | | | | |
|---|---|---|---|---|---|---|---|---|
| | | | | Pb | Ag | Zn | Cu | Fe |
| 0 | NaCN | 12.5 | 12.8 | 72.5 | 67.4 | 16.1 | 37.3 | 9.3 |
| 58 | Example 3 | 25 | 10.4 | 68.1 | 56.1 | 11.5 | 36.9 | 6.9 |
| 59 | Example 3 | 12.5 | 11.4 | 70.1 | 61.6 | 13.0 | 42.2 | 8.1 |

The results given in Table 15 clearly demonstrate the excellent depressant activity of the polymer for zinc and iron. At equal dosage, the depressant of Example 3 provides less zinc and Fe recoveries than cyanide (compare Examples M and 30). Copper recovery increases by 5 units, which is an advantage, while there is a slight recovery loss of lead and silver.

EXAMPLES 60-72

The flotation procedure is identical to that outlined for Example 1, except that a different pyrite sample is used. Polymers of Examples 9-19, 23 and 26 are evaluated for their depressant activity. With this pyrite sample, in the absence of any depressant, the pyrite recovery is 93% (average of 36 tests, range 85-100%). All of the polymers of Examples 9-19, 23 and 26 show depressasnt activity; flotation of pyrite is in the range 20-80%, and for a majority of these polymers flotation is in the range 20-50%.

What is claimed is:

1. A polymer composition comprising recurring units of the formula:

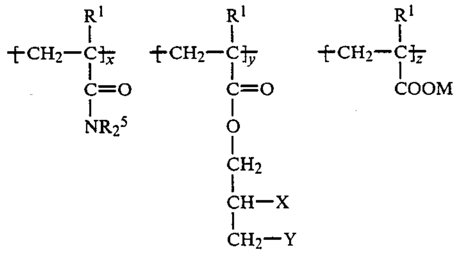

wherein each $R^1$ is, individually, hydrogen or $C_1$-$C_4$ lower alkyl; each $R^5$, individually, is hydrogen or $C_1$-$C_4$ lower alkyl group; X is OH or SH; Y is $OR^2$, each $R^2$, individually, is hydrogen or, a lower $C_1$-$C_4$ alkyl group, no more than one of Y or X being hydroxyl; M is hydrogen, an alkali metal or an ammonium ion; x is a mole fraction ranging from about 50% to about 99%; y is a mole percent fraction ranging from about 0.5% to about 25.0%, z is a mole percent fraction ranging from about 0.5% to about 25.0%; and the molecular weight of the polymer is between about 1,000 and 500,000.

2. A polymer composition according to claim 1 wherein each $R^1$ in the x and z units is hydrogen and the $R^1$ in the y unit is methyl; $R^5$ is hydrogen; X is OH; and $R^2$ is a lower $C_{1-4}$ alkyl group.

3. A polymer composition according to claim 1 wherein each $R^1$ in the x and z units is hydrogen and the $R^1$ in the y unit is methyl; $R^5$ is hydrogen; X is SH; and each $R^2$ is hydrogen.

* * * * *